(12) United States Patent
Maughan

(10) Patent No.: US 9,788,061 B2
(45) Date of Patent: Oct. 10, 2017

(54) METHODS AND SYSTEMS FOR RECOMMENDING MEDIA CONTENT RELATED TO A RECENTLY COMPLETED ACTIVITY

(71) Applicant: United Video Properties, Inc., Santa Clara, CA (US)

(72) Inventor: Benjamin H. Maughan, Pleasanton, CA (US)

(73) Assignee: Rovi Guides, Inc., San Carlos, CA (US)

( * ) Notice: Subject to any disclaimer, the term of this patent is extended or adjusted under 35 U.S.C. 154(b) by 375 days.

(21) Appl. No.: 14/084,029

(22) Filed: Nov. 19, 2013

(65) Prior Publication Data

US 2015/0143409 A1   May 21, 2015

(51) Int. Cl.
*H04N 21/466* (2011.01)
*H04N 21/442* (2011.01)
*H04N 21/262* (2011.01)

(52) U.S. Cl.
CPC ....... *H04N 21/4668* (2013.01); *H04N 21/262* (2013.01); *H04N 21/44213* (2013.01); *H04N 21/4667* (2013.01)

(58) Field of Classification Search
CPC ............ H04N 21/4668; H04N 21/262; H04N 21/4667; H04N 21/44213; H04N 21/466; G06F 17/30595; G06Q 30/0251; G06Q 10/109; G06Q 30/0255
See application file for complete search history.

(56) References Cited

U.S. PATENT DOCUMENTS

| | | | |
|---|---|---|---|
| 9,055,311 B1* | 6/2015 | Jayaram | H04N 21/2408 |
| 2005/0219055 A1* | 10/2005 | Takai et al. | 340/573.1 |
| 2006/0150216 A1* | 7/2006 | Herz | G06Q 20/383 |
| | | | 725/50 |
| 2008/0301737 A1* | 12/2008 | Hjelmeland Almas | |
| | | | H04N 5/445 |
| | | | 725/61 |
| 2011/0107374 A1* | 5/2011 | Roberts et al. | 725/46 |
| 2012/0021773 A1* | 1/2012 | Lee | 455/456.3 |
| 2012/0047087 A1* | 2/2012 | Amidon et al. | 705/347 |
| 2012/0101903 A1* | 4/2012 | Oh | G06Q 30/0269 |
| | | | 705/14.66 |
| 2013/0081084 A1* | 3/2013 | Scheer | 725/46 |
| 2014/0122502 A1* | 5/2014 | Kalmes | G06F 17/30029 |
| | | | 707/748 |
| 2015/0134653 A1* | 5/2015 | Bayer | G06F 17/3053 |
| | | | 707/732 |
| 2016/0255170 A1* | 9/2016 | Gargi | G06Q 30/0269 |
| | | | 709/204 |

* cited by examiner

*Primary Examiner* — Benjamin R Bruckart
*Assistant Examiner* — Tien M Nguyen
(74) *Attorney, Agent, or Firm* — Haley Guiliano LLP

(57) ABSTRACT

Methods and systems are disclosed herein for a media guidance application that recommends media content based on activities recently performed by a user. For example, in response to determining that a user recently finished the laundry, the media guidance application may recommend a movie that other users accessed after finishing the laundry.

20 Claims, 4 Drawing Sheets

500

502 — Receive an activity datum, related to an activity being performed by a user 504 — Cross-reference the activity datum with a database listing media assets accessed by users after preforming selected activities to identify a media asset associated with the activity 506 — Determine whether the media asset is available to the user following the activity 508 — In response to determining the media asset is available to the user, generate a recommendation of the media asset to the user

500

502
Receive an activity datum, related to an activity being performed by a user

504
Cross-reference the activity datum with a database listing media assets accessed by users after preforming selected activities to identify a media asset associated with the activity

506
Determine whether the media asset is available to the user following the activity

508
In response to determining the media asset is available to the user, generate a recommendation of the media asset to the user

FIG. 5

METHODS AND SYSTEMS FOR RECOMMENDING MEDIA CONTENT RELATED TO A RECENTLY COMPLETED ACTIVITY

BACKGROUND

Media content delivery systems such as cable, satellite, and Internet systems provide users with a plethora of available media content. However, users are often not aware of all the media content available to them. Moreover, even if users are aware of media content, they may not know whether or not the media content will appeal to them.

SUMMARY

Accordingly, methods and systems are disclosed herein for a media guidance application that recommends media content based on activities recently performed by a user. For example, in response to determining that a user recently finished the laundry, the media guidance application may recommend a movie that other users accessed after finishing the laundry.

In some aspects, the media guidance application may receive an activity datum, related to an activity being performed by a user. The media guidance application may then cross-reference the activity datum with a database listing media assets accessed by users after performing selected activities to identify a media asset associated with the activity. The media guidance application may then determine whether the media asset is available to the user following the activity, and in response to determining the media asset is available to the user, recommending the media asset to the user.

For example, the media guidance application implemented upon a user device may receive an indication from a home appliance (e.g., a dishwasher) that a dish washing cycle has begun. Based on this information, the media guidance application may determine that a user is currently cleaning the kitchen. The media guidance application may then cross-reference the activity (i.e., cleaning the kitchen) with a database that lists media assets associated (e.g., related to cleaning the kitchen) with the activity. After determining a media asset (e.g., a kitchen renovation reality television show) that is associated with cleaning the kitchen, the media guidance application determines whether or not the media asset is available (e.g., determines whether the media asset is being broadcast, available on-demand, or previously recorded) following the activity. If the media asset is available at that time, the media guidance application generates a recommendation of the media asset to a user.

In some embodiments, the media guidance application may also determine a time of completion for the activity and whether or not the media asset is available at the time of completion. For example, the media guidance application may determine a time (e.g., fifteen minutes) at which the user will complete the activity currently being performed (e.g., cleaning the kitchen). The media guidance application may then determine whether or not a media asset associated with the activity is available when the user completes the activity (e.g., fifteen minutes from the current time).

In some embodiments, the media guidance application may also determine a window of availability for the user following the activity. For example, the user may only be available for a brief amount of time (e.g., thirty minutes) following the activity before the user must begin a different activity (e.g., attend a medical appointment). The media guidance application may then determine whether the window of availability corresponds to a run-time (e.g., the amount of time necessary to access the media asset) of the media asset, and in response to determining the window of availability does not correspond to the run-time of the media asset, the media guidance application may select a different media asset. For example, if the media guidance application initially selects a media asset that has a run-time of one hour, but determines the user is only available for thirty minutes, the media guidance application may select a different media asset (e.g., a media asset with a run-time of thirty minutes).

In some embodiments, the media guidance application may determine a type of user equipment available to the user following the activity. For example, the media guidance application may determine that after cleaning the kitchen the user may enter the living room, which includes a television. Alternatively, the media guidance application may determine that after lifting weights at the gym, the user may go for a jog at which point the user will be a carrying only a smartphone. The media guidance application may then determine whether the type of user equipment available to the user corresponds to presenting the media asset. For example, while a user may be able to technically view a movie on a smartphone, the small screen size may make accessing the movie undesirable to a user. Alternatively, while a user may be able to access a recording of the media asset using a home DVR, the user may not be able to access the DVR using the smartphone. In response to determining that the type of user equipment available to the user does not correspond to presenting the media asset, the media guidance application may select a different media asset.

In some embodiments, the media guidance application may also identify a user device within a threshold proximity to the user following the activity for generating a presentation of a recommendation. For example, the media guidance application may determine that following an activity, a user will pass by a television, is using a personal computer, or is carrying a smartphone. Given that the user is within the threshold proximity to each of these devices, the media guidance application may generate a presentation of a recommendation on one or more of the devices.

In some embodiments, the recommendations may be personalized based on the particular user. For example, the media guidance application may identify a particular user (e.g., as identified by the activity datum) and cross-reference the activity in a database compiled using information from users in a similar demographic, social network, familial, or other grouping in order to recommended a media asset associated with the activity based on users in similar groupings accessing the media asset after performing the particular activity.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 is a flow-chart of illustrative steps involved in recommending media assets associated with an activity in accordance with some embodiments of the disclosure.

DETAILED DESCRIPTION OF THE DRAWINGS

Figure 1:
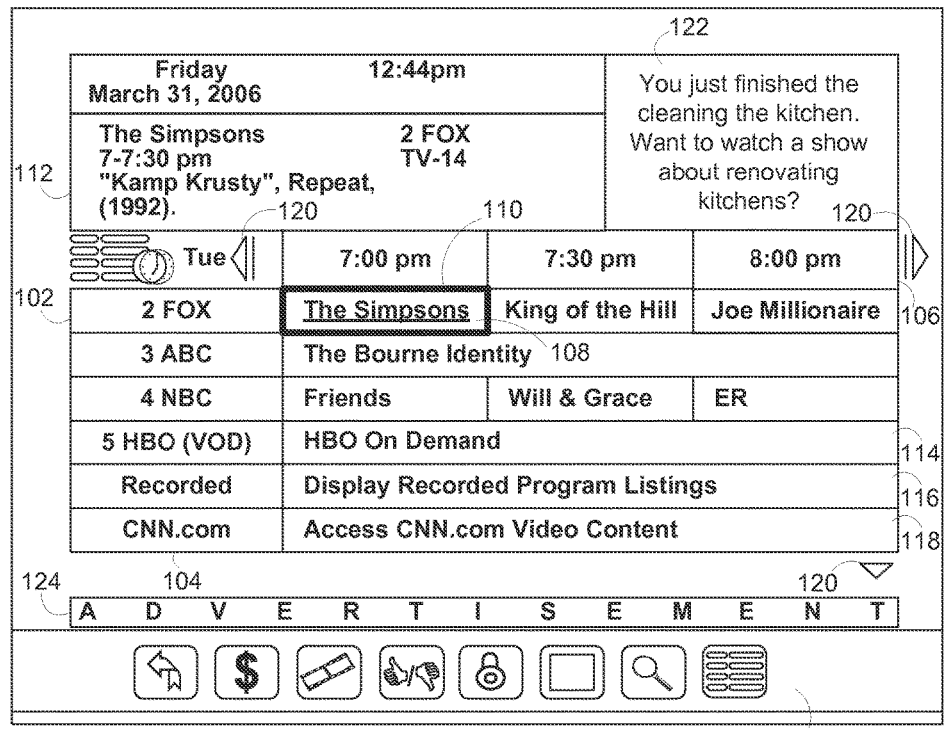
FIG. 1 shows an illustrative media guidance application for recommending activities associated with activities in accordance with some embodiments of the disclosure.

Methods and systems are disclosed herein for a media guidance application that recommends media content based on activities recently performed by a user. For example, in response to determining that a user recently finished the laundry, the media guidance application may recommend a movie that other users accessed after finishing the laundry.

As referred to herein, an "interactive media guidance application" or, sometimes, a "media guidance application" or a "guidance application" refers to an application that provides media guidance through an interface that allows users to efficiently navigate, identify, and select media assets and/or media guidance data.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, an "activity" refers to a specified pursuit in which a user partakes that requires movement of the body. For example, the activity may be a physical activity, which is an activity that requires bodily movement produced by skeletal muscles that requires energy expenditure. The activity may also be a social activity, which is an activity that involves more than a single person. In some embodiments the activity may accompany the consumption of a media asset. For example, activities such as attending a movie, eating dinner, riding in a taxi, driving a car, etc. may all be accompanied by the presentation of a media asset (e.g., a movie, a song, a game, etc.).

In some embodiments, the media guidance application may receive an activity datum, related to an activity being performed by a user. As referred to herein, "an activity datum" is any information, regardless of the source, that describes an activity that has been performed, is currently being performed, or will be performed by a user. In some embodiments, an activity datum may also identify one or more users performing one or more activities, including one or more groups (e.g., demographic group, social network group, familial group, and/or any other grouping based on any suitable criteria) associated with the user(s), the reason the one or more users are performing the activity, when one or more activities occurred, is occurring, or will likely occur (e.g., when an activity likely began, when the activity will likely end, etc.), where one or more activities occurred, and/or any other information relevant to the recommendation of media assets based on one or more activities.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
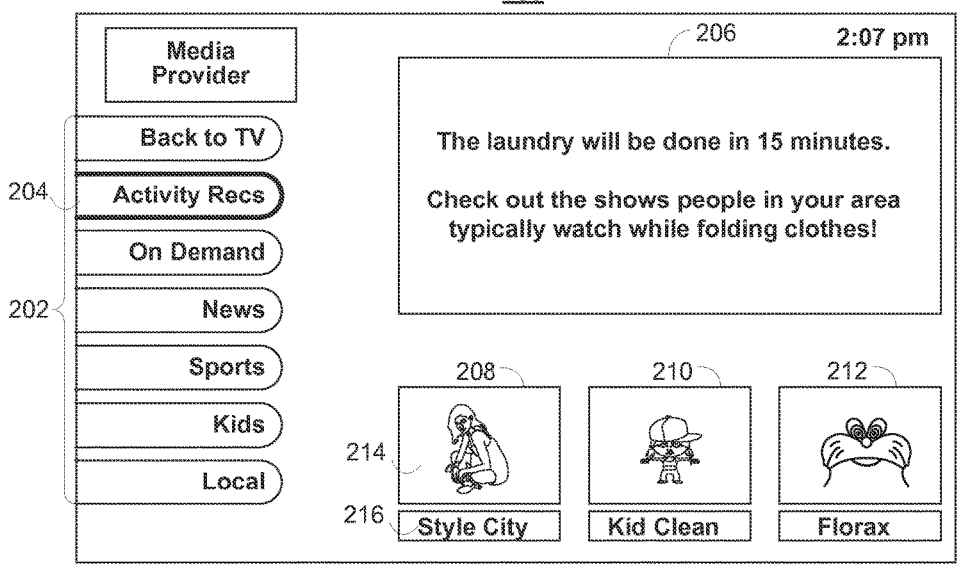
FIG. 2 shows an illustrative media guidance application for generating a display of media assets associated with an activity in accordance with some embodiments of the disclosure.

FIGS. 1 and 2 show illustrative display screens that may be used to provide media guidance data. The display screens shown in FIGS. 1 and 2 may be implemented on any suitable user equipment device or platform. While the displays of FIGS. 1 and 2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 currently presents message querying a user as to whether or not the user would like to view a media asset recommendation based on a recently performed activity. For example, the media guidance application implemented upon a user device may receive an indication (e.g., an activity datum) from a home appliance (e.g., a dishwasher, refrigerator, microwave, etc.) that one or more activities associated with cleaning the kitchen were recently performed.

In some embodiments, the media guidance application may detect the use of one or more user devices in order to determine a user activity. For example, the media guidance application may detect that a dishwasher was recently run (e.g., indicating that a user is/was washing dishes), a refrigerator was recently opened/closed a threshold number of times (e.g., indicating that groceries were put away), an oven is currently in "clean" mode (e.g., indicating that a user is no longer cooking), a vacuum cleaner has recently been used (e.g., in order to vacuum the kitchen), etc.

In some embodiments, the media guidance application may also detect users that are within a vicinity of a user device currently being used. For example, a media guidance application may detect a first smartphone (e.g., carried in the pocket of a first user) is currently in the kitchen (or an associated GPS coordinate), while a second smartphone (e.g., carried in the pocket of a second user) is currently in the garage (or an associated GPS coordinate) based on GPS data received from the smartphone. Moreover, the media guidance application may determine that a lawnmower, which was recently used to mow the lawn, is also located in the garage (or an associated GPS coordinate). Based on the determination that a recently used device (e.g., the lawnmower) and the second user are in close proximity, the media guidance application may determine that the second user recently performed the activity of mowing the lawn.

In some embodiments, the media guidance application may analyze captured audio or video data to determine activities that are/were being performed. For example, the media guidance application may access a content recognition module or algorithm to determine the objects in received data (e.g., a captured video). The content recognition module may use object recognition techniques such as edge detection, pattern recognition, including, but not limited to, self-learning systems (e.g., neural networks), optical character recognition, on-line character recognition (including but not limited to dynamic character recognition, real-time character recognition, intelligent character recognition), and/or any other suitable technique or method to determine the objects and/or relationship between the objects in received data in order to identify a user, determine whether or not a user is performing an activity, and if so, determine the type of activity being performed by the user.

For example, the media guidance application may receive data in the form of a video (e.g., captured via a content capture device at a location of the user). The video may include a series of frames. For each frame of the video, the media guidance application may use a content recognition module or algorithm to determine the objects (e.g., people, appliances, furniture, etc.) in each of the frame or series of frames.

The media guidance application may then input the identified user and objects into a database to determine an activity being performed. For example, if the media guidance application determines that a first object (e.g., a user) is loading a second object (e.g., clothes) into a third object (e.g., a washing machine), the media guidance application may then cross-reference this information with a database associated with objects used in various activities to determine an activity associated with these objects (e.g., doing laundry).

In some embodiments, the content recognition module or algorithm may also include speech recognition techniques, including but not limited to Hidden Markov Models, dynamic time warping, and/or neural networks (as described above) to translate spoken words into text and/or processing audio data. For example, in order to identify a user, determine whether or not a user is performing an activity, and if so, determine the type of activity being performed by the user, the media guidance application may determine words spoken or used at the location (e.g., by the user or other users). The content recognition module may also combine multiple techniques to determine the objects and/or relationship between objects in received data.

Based on the received activity data, the media guidance application may determine that a user was cleaning the kitchen. The media guidance application may then cross-reference the activity (i.e., cleaning the kitchen) with a database that lists media assets associated (e.g., related to cleaning the kitchen) with the activity.

In some embodiments, the media guidance application may additionally or alternatively recommend media assets with subject matter associated with the activity recently performed by the user. For example, if the user was recently washing his car, the media guidance application may recommend a media asset associated with cars. In such embodiments, the database may include information about the subject matter of each media asset. In response to receiving an input (e.g., an activity datum associated with a particular activity), the database may output a list of media assets associated with that activity.

After determining a media asset (e.g., a kitchen renovation reality television show) that is associated with cleaning the kitchen, the media guidance application determines whether or not the media asset is available (e.g., determines whether the media asset is being broadcast, available on-demand, or previously recorded) following the activity. If the media asset is available at that time, the media guidance application recommends the media asset to a user (e.g., in response to a user selection of video region 122). It should be noted, in some embodiments, the media guidance application may also compare other criteria (e.g., as discussed below in relation to FIGS. 5-6) to determine whether or not to recommend a media asset.

Although in FIG. 1 the media guidance application generated a query for a recommendation in video region 122, in some embodiments, the media guidance application may generate recommendations without querying the user. For example, the media guidance application may automatically generate a recommendation for a media asset in response to a user finishing an activity or in response to a user turning on, interacting with, and/or being within a threshold proximity of a user device after finishing an activity.

As referred to herein, a "threshold proximity" refers to the maximum proximity within which a user device may be located from a user. It should be noted that the threshold proximity is not limited to any particular metric, and a threshold proximity may be defined by any suitable criteria. For example, the threshold proximity may define a particular geographic area, a particular network(s), or any other set of criteria that prospective devices must meet in order to be considered by the media guidance application. Systems and methods for detecting whether a user device is within a threshold proximity or detection region are described in greater detail in Shimy et al. U.S. Patent App. Pub. No. 2011/0069940, filed Sep. 23, 2009, which is hereby incorporated by reference herein in its entirety.

In some embodiments, the media guidance application may also determine a type of user device. As referred to herein, "a type" of device is a grouping of devices distinguished by a common characteristic from other devices. For example, a type of device may refer to a type of consumer electronic (e.g., whether the device is a television, a tablet, a personal computer, a radio, a smartphone, etc.). In another example, the type of device may refer to the capabilities of the device. The capabilities of the device may refer to whether or not a particular device can output audio and/or video; how quickly, if at all, content may be downloaded to the device; the power connection and/or battery life; whether or not the device is a mobile device; the resolution, codecs, formats, etc. supported by the device; and/or any other characteristic of a user device that may be relevant to the recommendation of a media asset for presentation on the user device.

In some embodiments, the media guidance application may recommend an itinerary of a media asset recommendation, in which the summation of the run-times of the media assets corresponds to a window of availability of a user. As referred to herein, "a window of availability" is a length of time, beginning at a beginning point and ending at an ending point, during which a user may consume one or more media assets. For example, a window of availability may include a period of time following the completion of an activity and preceding the initiation of another activity. In another example, a window of availability may include a period of time during which a user has access to a user device capable of presenting a media asset. For example, the media guidance application may determine that a user has access to a user device (e.g., a smartphone) during particular parts of the day (e.g., during scheduled breaks during the work day).

In some embodiments, a window of availability may be relative to a particular activity. For example, a user may need to mow the lawn after a break of thirty minutes. Such an activity may prevent the user from consuming a media asset that requires a user to watch the media asset after the thirty minute break. However, the window of availability for listening to a song may extend beyond the thirty minute break as a user can listen to the song while mowing the lawn.

In some embodiments, video region 122 may allow the user to view media assets recommended by the media guidance application. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. FIG. 2 shows an illustrative media guidance application for generating a display of media assets associated with an activity. Video mosaic display 200 includes selectable options 202. In response to receiving a user selection of option 204, the media guidance application has recommended several media assets associated with an activity recently performed by the user.

In some embodiments, the media guidance application may generate display 200 in response to a user selecting video region 122 (FIG. 1), while a message querying the user for an activity recommendation is displayed. Alternatively or additionally, the media guidance application may generate display 200 automatically. For example, the media guidance application may automatically generate display 200 in response to a user finishing an activity or in response to a user turning on, interacting with, and/or being within a threshold proximity of a user device after finishing an activity.

In some embodiments, display 200 may include other selectable options for customizing a recommendation. For example, display 200 may include a selectable option that allows a user to input a particular location of the user and/or the location of one or more user devices. Alternatively or additionally, the media guidance application may retrieve location information for the user or user devices based on a global positioning system ("GPS"). The media guidance application may also receive (e.g., via a user input) a selection of a threshold proximity, which may indicate the criteria used to generate the threshold proximity (e.g., a particular geographic radius from the user that the user is able to travel).

Display 200 may also include a selectable option that allows a user to input a window of availability or schedule one or more activities that may affect the window of availability of the user. For example, the media guidance application may determine via a user input that a user has class from six o'clock to eight o'clock tonight. Therefore, the media guidance application may not recommend any media assets during that time. In some embodiments, the media guidance application may detect conflicts between recommendations and activities. In such cases, the media guidance application may generate a prompt querying the user for a resolution to the conflict.

It should be noted, in display 200 that the recommendation may include graphical images including cover art, still images from the content, video clip previews, live video from the content, or other types of content that indicate to a user the content being described by the media guidance data in the listing. Each of the graphical listings may also be accompanied by text to provide further information about the content associated with the listing.

In FIG. 2, display 200 includes multiple video regions (e.g., regions 208, 210, and 212), all of which relate to the activity (e.g., laundry) described in video region 206. Video region 206 and regions 208, 210, and 212 are of different sizes (i.e., region 218 is larger than region 208, 210, and 212), but if desired, all the regions may be the same size. Regions may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

In display 200, video regions 208, 210, and 212 include three recommendations, respectively. Each recommendation includes a media asset (e.g., media asset 214) and media guidance data (e.g., title information 216) about the recommendation. As indicated by video region 206, the recommendation in video regions 208, 210, and 212 relate to media assets that are typically enjoyed while a user folds clothes. For example, in response to determining that the laundry will be done soon, the media guidance application may recommend a media asset for the user to consume while performing a subsequent activity.

In some embodiments, the media guidance application may recommend media assets based on activities that the user is currently performing or may perform. For example, the media guidance application may recommend a media asset based on determining that the user is currently washing clothes. Additionally or alternatively, the media guidance application may recommend media assets based on activities the user is likely to or will perform. For example, in response to receiving activity data from a dryer indicating that the drying cycle will be completed soon, the media guidance application may cross-reference a database associated with activity relationships for possible activities that occur after the drying cycle is complete. In response to determining that the user typically folds clothes after the drying cycle is complete, the media guidance application recommends media assets that are often viewed while performing that activity (folding laundry).

It should be noted that the features discussed in relation to FIGS. 1 and 2 are illustrative only, and displays with more or fewer features are fully contemplated by this disclosure.

Figure 3:
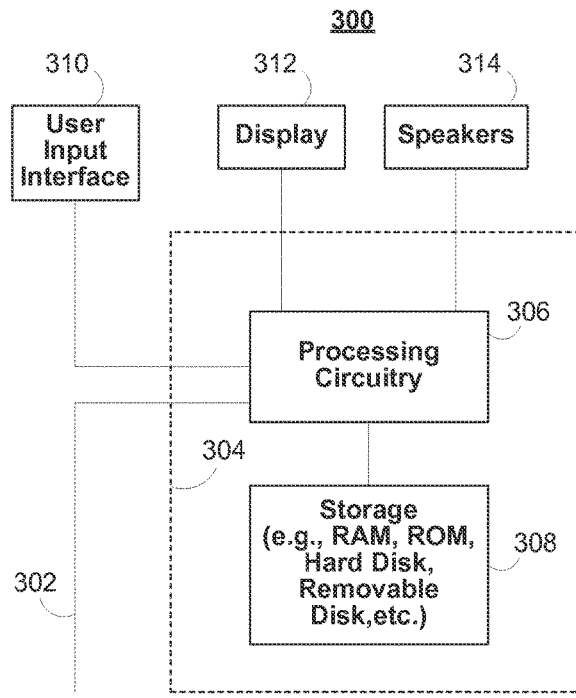
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
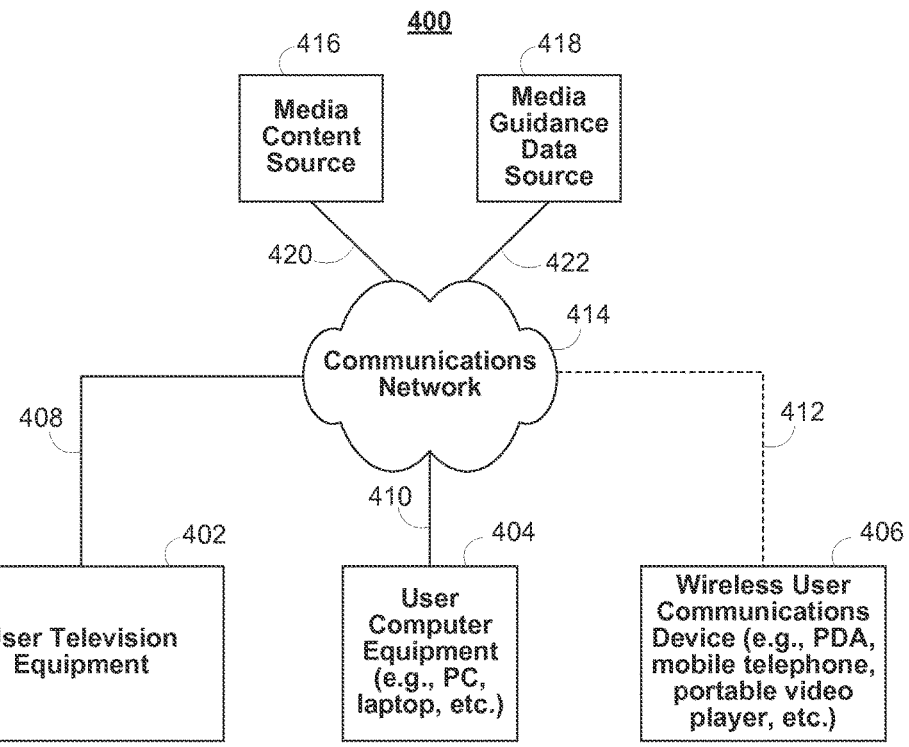
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 is a flow-chart of illustrative steps involved in recommending media assets associated with an activity. It should be noted that process 500 or any step thereof could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to produce a display (e.g., display 100 (FIG. 1) or display 200 (FIG. 2)) of media assets associated with an activity performed by a user. In addition, one or more steps of process 500 may be incorporated into or combined with one or more steps of any other process or embodiments (e.g., process 600 (FIG. 6)).

At step 502, the media guidance application receives an activity datum related to an activity being performed by a user. In some embodiments, the activity datum may be received from a user. For example, a user (e.g., via user input interface 310 (FIG. 3)) may enter one or more inputs, which are received by the media guidance application indicating an activity currently being performed, has been performed, or will be performed. The activity datum may be received at any time. For example, the activity datum may be entered before the activity (e.g., as a future appointment in a calendar), concurrently (e.g., as a status update on a social network), or after the activity (e.g., as a journal or log entry).

In some embodiments, in response to one or more of the inputs, the media guidance application (e.g., via control circuitry 304 (FIG. 3)) may associate the user inputs with one or more activities. For example, in some embodiments, a user input may identify a particular activity being performed. Alternatively or additionally, the media guidance application may determine that activity associated with one or more inputs by determining a context associated with one or more input.

For example, in response to a user input scheduling a meeting with "Ken." The media guidance application may determine the identity of "Ken" using information associated with the user (e.g., stored locally in storage 308 (FIG. 3) or remotely at any location accessible via communications network 414 (FIG. 4)) and/or other information. For example, the media guidance application may determine that the name "Ken" is associated with a co-worker and a close friend. Furthermore, the media guidance application may determine that the scheduled meeting is during the weekend, a time that the user does not typically work. Based on this information, the media guidance application determines that the scheduled meeting with "Ken" is associated with a social activity with a close friend.

In some embodiments, the activity datum may be received from another user device. For example, the media guidance application implemented upon a user device (e.g., user equipment devices 402, 404, and/or 406 (FIG. 3)) may receive an indication from a home appliance (e.g., a microwave) that a meal is being cooked. For example, in response to receiving a user input, the microwave may transmit an activity datum to the media guidance application.

The media guidance application may connect to other devices using any of the communications paths (e.g., paths 408, 410, and 412 (FIG. 4)) discussed above. For example, the microwave may connect to the media guidance application via USB cables, IEEE 1394 cables, wireless paths (e.g., Bluetooth, infrared, IEEE 802-11x, etc.), and/or any other Internet pathway and/or short-range communication via wired or wireless paths.

Additionally or alternatively, the media guidance application may detect that the microwave is currently in use. Based on this information, the media guidance application may determine that a user is currently eating a meal. Additionally, the media guidance application may determine a context associated with the activity datum. For example, the media guidance application may determine the identity of the user by comparing known users of the microwave (e.g., as retrieved from storage 308 (FIG. 3) or any location accessible via communications network 414 (FIG. 4)) and/or other information. For example, the media guidance application may determine that although the household is associated with three users, only one user is typically home at this time of day based on the user profiles (e.g., stored locally in storage 308 (FIG. 3) or remotely at any location accessible via communications network 414 (FIG. 4)) associated with the three users.

In some embodiments, the activity datum may be received from a user and another device. For example, the media guidance application implemented upon a user device (e.g., user equipment devices 402, 404, and/or 406 (FIG. 3)) may detect a garage door of a household associated with a user of the media guidance application is opening. Based on this information, the media guidance application may determine that a user is returning home. Additionally, the media guidance application may determine a context associated with the activity datum based on prior user inputs. For example, the media guidance application may determine that a social network update from the user indicated that the user was previously at the gym. Based on the information from both the garage door and the social network, the media guidance application may determine that the user is currently returning home from the gym.

At step 504, the media guidance application cross-references the activity datum with a database listing media assets accessed by users after performing selected activities to identify a media asset associated with the activity. For example, the media guidance application may input (e.g., using control circuitry 304 (FIG. 3)) the received activity datum into a database (e.g., storage 308 (FIG. 3) or a storage device accessible via communications network 414 (FIG. 4)). The database (e.g., structured as a look-up table) may identify (e.g., in response to instructions issued by the media guidance application) all media assets in the database that were accessed by users after performing the activity indicated by the activity datum.

At step 506, the media guidance application determines whether the media asset is available to the user following the activity. For example, the media guidance application may identify one or more media assets associated with the activity based on the cross-reference is step 504. The media guidance application may then determine whether or not each of those media assets is available.

For example, the database may search available media assets from one or more local (e.g., user equipment devices 402, 404, and/or 406 (FIG. 4)) and/or remote sources (e.g., media content source 416 (FIG. 4) and/or any location accessible via communications network 414 (FIG. 4)). In such cases, the media guidance application (e.g., via control circuitry 304 (FIG. 3)) may identify media assets associated with the media asset that may or may not be available to the user.

In some embodiments, the media assets may not be available to the user because the media asset is currently unavailable from the content source. For example, the media guidance application may not be currently able to access the media asset because the media asset is not currently being broadcast, a remote server used to process a request for the media asset is having technical difficulties, an Internet connection used to stream the media asset does not currently have enough bandwidth, a user device upon which the media guidance application is implemented is not configured to receive/play the current format of the media asset, etc. To determine whether or not the media guidance application has access to the media asset, the media guidance application may ping the content source (e.g., media content source 416 (FIG. 4)) for information related to the media asset and transfer of the media asset and/or compare the capabilities of the user device (e.g., user device 300 (FIG. 3)) upon which the media guidance application is implemented to receive information.

In some embodiments, the media guidance application may not have the proper rights and/or authorization to access a particular media asset. For example, the media guidance application may need a subscription, password (e.g., to overcome a parental control setting), membership status, or other fee arrangement to access the media asset. While in some embodiments, the media guidance application may prompt the user regarding obtaining the proper authorization. In some embodiments, the media guidance application may exclude media assets to which the user does not have rights and/or authorization entirely. To determine whether or not the media guidance application has access to the media asset, the media guidance application may compare the rights and/or authorization information associated with a media asset (e.g., as indicated by data transmitted and/or associated with the media asset or as indicated by a provider of the media asset) to rights and/or authorization information (e.g., retrieved from storage 308 (FIG. 3)) and/or any location accessible via communications network 414 (FIG. 4)) associated with the user (e.g., a user profile) and/or the user device (e.g., user device 300 (FIG. 3)) upon which the media guidance application is implemented.

In some embodiments, the media guidance application (e.g., via control circuitry 304 (FIG. 3)) may only search for media assets that are available. For example, the database used to cross-reference the activity the user is currently performing may be limited to media assets that are currently being (or will be) broadcast, are available on-demand, are previously recorded, and/or otherwise are readily available to a user.

At step 508, in response to determine the media asset is available to the user, the media guidance application generates a recommendation of the media asset to the user. For example, in response to determining that the media asset is both associated with the activity and available, the media guidance application (e.g., via control circuitry 304 (FIG. 3)) may recommend the media asset to the user. For example, the media guidance application may generate a media listing of a media asset that corresponds to an activity performed by the user (e.g., as shown in relation to FIGS. 1 and 2).

In some embodiments, the media guidance application may query a user (e.g., as shown in FIG. 1) related to whether or not a user wishes to receive a program recommendation. Alternatively or additionally, the media guidance application (e.g., via control circuitry 304 (FIG. 3)) may generate recommendations without query the user. In some embodiments, the recommendation may be synchronized relative to the activity of the user and/or relative to the proximity of a user to a user device. For example, the media guidance application may automatically generate a recommendation for a media asset in response to a user finishing an activity. As discussed below, in relation to FIG. 6, the media guidance application may estimate a completion time for a current activity, and generate a recommendation at that time.

In another example, the media guidance application (e.g., via control circuitry 304 (FIG. 3)) may recommend a media asset in response to determining that a user is within a threshold proximity of a user device. The media guidance application (e.g., via control circuitry 304 (FIG. 3)) may detect the user using various means such as passively monitoring for the presence of the user in a particular radius around a user device. For example, the media guidance application may retrieve (e.g., via I/O path 302 (FIG. 3)) information related to the GPS coordinates of a user. For example, the media guidance application may be implemented on, or have access to a user device (e.g., user device 300 (FIG. 3)), which includes a global positioning module capable of detecting the user and/or a device typically worn or carried by the user (e.g., a smartphone). Based on information from the module, the media guidance application (e.g., via processing circuitry 306 (FIG. 3)) may determine a location of a user. In some embodiments, the media guidance application may retrieve (e.g., via I/O path 302 (FIG. 3)) scheduling information (e.g., from a calendar application incorporated into or accessible by the media guidance application) associated with the user to determine a location (e.g., indicating that the user is at home, the office, etc.). Additionally or alternatively, the media guidance application may await a user input (e.g., received via user input interface 310 (FIG. 3)) that indicates the user is within the threshold proximity (e.g., a user input turning on, interacting with, and/or otherwise manipulating the user device).

The media guidance application (e.g., via control circuitry 304 (FIG. 3)) may generate the recommendation in various forms and with varying amounts of media assets. For example, the recommendation may feature a list of media assets that correspond to one or more recently performed activities, or the recommendation may feature only a single media asset. The recommendation may appear as a pop-up message, a display window (e.g., video region 122 (FIG. 1), a menu page, an overlay, and/or any other suitable method for conveying information to a user.

In some embodiments (e.g., as discussed in relation to FIG. 6), the media guidance application (e.g., via control circuitry 304 (FIG. 3)) may base the recommendation on other factors such as criteria and/or user preference retrieved from a user profile, the type of user device, the window of availability of the user, and/or any other suitable factors. In some embodiments, the media guidance application may process information (e.g., retrieved from storage 308 (FIG. 3) or a storage device accessible via communications network 414 (FIG. 4)) about these factors before recommending a media asset. For example, the information may indicate the distance to a user device suitable for presenting the media asset and the time necessary to consume the media asset as described below in relation to FIG. 6.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 5 in such alternative orders or in parallel.

Figure 6:
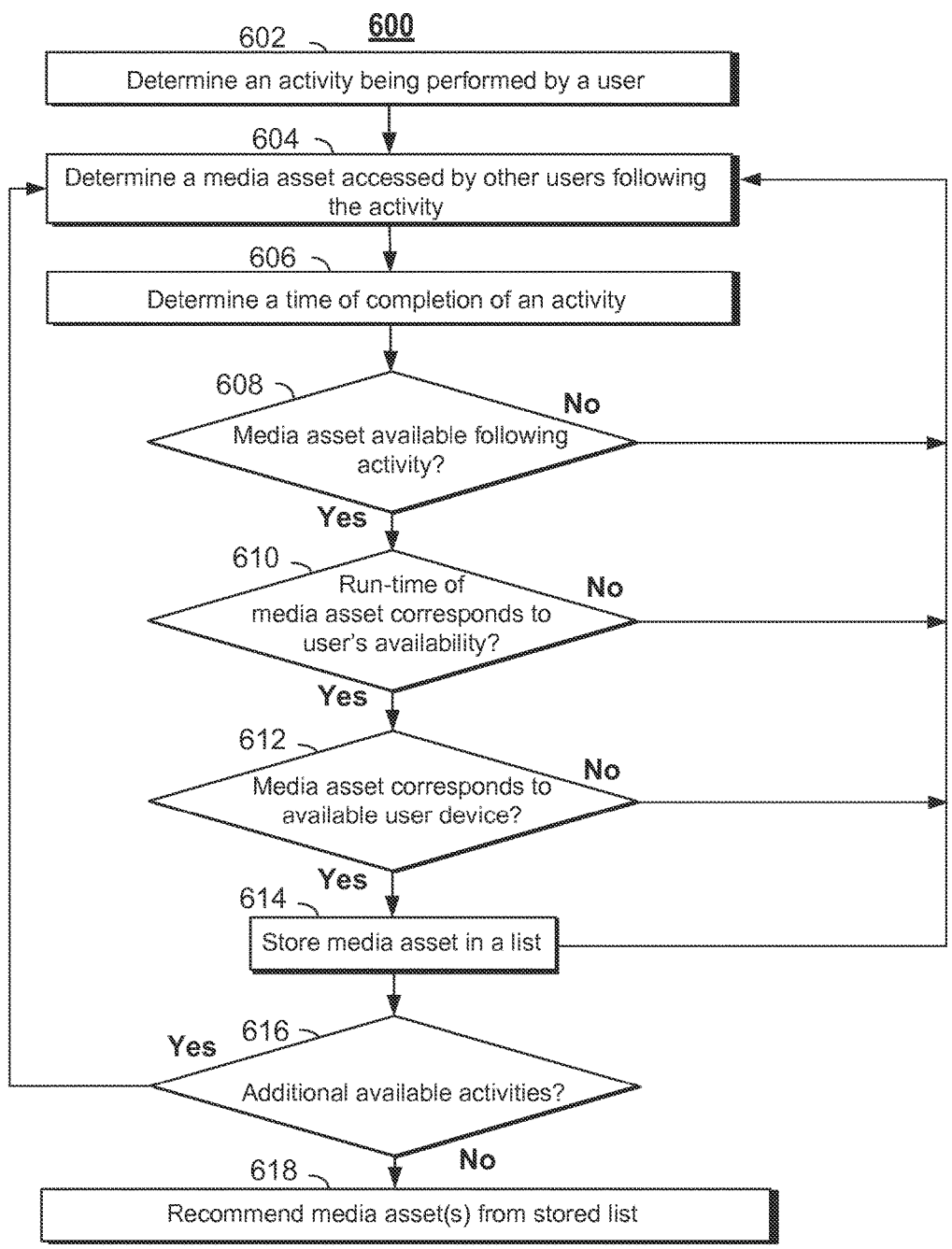
FIG. 6 is a flow-chart of illustrative steps involved in recommending a media asset based on criteria associated with the media asset in accordance with some embodiments of the disclosure.

FIG. 6 is a flow-chart of illustrative steps involved in recommending a media asset based on criteria associated with the media asset. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to produce a display (e.g., display 100 (FIG. 1) or display 200 (FIG. 2)) of media assets associated with an activity performed by a user. In addition, one or more steps of process 600 may be incorporated into or combined with one or more steps of any other process or embodiments (e.g., process 500 (FIG. 5)).

At step 602, the media guidance application determines an activity being performed by a user. For example, the media guidance application may determine based on actively monitoring (e.g., via content capture devices incorporated into or accessible by the control circuitry 304 (FIG. 3)) a user, based on information received from another device (e.g., via I/O path 302 (FIG. 3)) or the user (e.g., via user input interface 310 (FIG. 3)), or by any other suitable means that a user was/is performing (or not performing) an activity.

For example, the media guidance application may detect that a car associated with the user has recently driven to an Italian restaurant (e.g., based on GPS data tracking the car) and has returned (e.g., indicating that a user was eating dinner), a personal computer was recently accessing a word processing application (e.g., indicating that a user was doing homework), a bio-metric monitor worn by a user was registering an elevated heartbeat (e.g., indicating that a user was exercising), a television remote has not been used (e.g., indicating that a user was not watching television), etc.

In another example, the media guidance application may analyze captured audio or video data to determine activities that are/were being performed based on the techniques discussed above. For example, if the media guidance application determines that a first object (e.g., a first user) is in close proximity to a second object (e.g., a second user) and both are speaking (e.g., producing a detectable audio output), the media guidance application may then determine that the first and second user are engaged in a conversation and analyze the conversation for keywords to determine an activity (e.g., associated with a topic of the conversation) currently being performed.

In another example, the media guidance application may use multiple data sources to determine an activity being performed. For example, the media guidance application may monitor social media networks (e.g., for status updates posted by a user), credit card purchases and/or on-line transactions, search histories, etc. Furthermore, the media guidance application may compare different types of information to identify particular activities. For example, the media guidance application may compare status updates to credit card purchases to identify an activity of a user.

At step 604, the media guidance application determines a media asset accessed by other users following the activity. For example, in some embodiments, as discussed in relation to FIG. 5, the media guidance application may cross-reference data (e.g., an activity datum) with a database listing media assets accessed by users after performing selected activities to identify a media asset associated with the activity.

In some embodiments, to generate the database, the media guidance application may receive (e.g., from media content source 416 (FIG. 4), media guidance data source 418 (FIG. 4) and/or any other location accessible via communications network 414 (FIG. 4)) information related to what media assets, if any, were accessed by users following certain activities. For example, the media guidance application may use one or more of the techniques used to monitor the use (as discussed herein) to monitor other users for this information.

In some embodiments, the media guidance application may receive the information from one or more sources. For example, the information may be received (e.g., via I/O path 302 (FIG. 3)) from a single source or may be aggregated from multiple sources. In some embodiments, the information may be generated by a third-party (e.g., a third-party user profiling service) and accessed by the media guidance application.

In some embodiments, the information may also indicate relationships between the users. For example, in addition to what media assets, if any, were accessed by users following certain activities, the information may indicate the demographics, social networks, family status, and/or any other information related to any particular user. For example, the information may indicate that a user of a particular age, with a particular occupation, prefers a particular genre of media assets after a particular activity.

In some embodiments, the information may be organized into a local (e.g. at storage 308 (FIG. 3) of user equipment device 402, 404, and/or 406 (FIG. 4)) and/or remote (e.g., at media content source 416 (FIG. 4) and/or any location accessible from communications network 414 (FIG. 4)) database such that a media guidance application may filter the information according to particular criteria. For example, the media guidance application (e.g., via control circuitry 304 (FIG. 3)) may request a list of media assets that were accessed after a particular activity by a certain class or group of users (e.g., users sharing the same grouping as a current user). The media guidance application may then request the media assets associated with an activity for those users. For example, the media guidance application may retrieve (e.g., via control circuitry 304 (FIG. 3)) a list of all media assets accessed by users that are the same age of a current user (e.g., as determined by information retrieved from a user profile associated with the current user) after doing laundry from the database. The media guidance application may then select one or more media assets from the list outputted by the database.

At step 606, the media guidance application determines a time of completion of an activity the user is currently performing. In some embodiments, the media guidance application may determine a time (e.g., fifteen minutes) at which the user will complete the activity currently being performed (e.g., cleaning the kitchen) based on numerous methods.

For example, the media guidance application may determine a completion time of an activity based on a user input. For example, as discussed in relation to FIG. 2, the media guidance application may allow a user to input various information (e.g., via a user input interface). The media guidance application may receive a user input identifying a potential completion time of an activity (e.g., as part of scheduled activity). For example, the media guidance application may receive a user input that a user has class from six o'clock to eight o'clock tonight. Therefore, as the scheduled appointment ends at 8 o'clock, the media guidance application may (e.g., via control circuitry 304 (FIG. 3)) determine that the completion time of the activity is 8 o'clock.

In another example, the media guidance application may (e.g., via control circuitry 304 (FIG. 3)) determine a potential completion time for an activity based on information received (e.g., an activity datum) from another device. For example, a microwave may indicate that it has three minutes remaining in its heating cycle. Therefore, the media guidance application may determine that the user will complete a particular activity (e.g., cooking dinner) in three minutes.

In another example, the media guidance application may compare a particular activity being performed by a user to a database indicating typical time that the activity takes to perform. For example, the media guidance application may cross-reference the activity with a database associated with data about activities to retrieve information related to the length of time a particular activity requires to perform for all users or users meeting a particular (e.g., users having similar characteristics to the current user). For example, the media guidance application may input (e.g., using control circuitry 304 (FIG. 3)) an activity into the database (e.g., storage 308 (FIG. 3) or a storage device accessible via communications network 414 (FIG. 4)). The database (e.g., structured as a look-up table) may retrieve a field associated with the activity, in which a value or values indicative of the time required to perform an activity are contained. The media guidance application may then receive an output of the value or values in the field. The media guidance application may then determine (e.g., via processing circuitry 306 (FIG. 3)) if the value or values corresponds (e.g., has a sufficient amount of similarity) to time of completion of the activity based on the outputted value or values.

At step 608, the media guidance application determines whether or not the media asset is available following the activity. In some embodiments, this step may correspond to step 508 (FIG. 5)). For example, the media asset associated with the activity being performed by the user may be located at one or more local (e.g., user equipment devices 402, 404, and/or 406 (FIG. 4)) and/or remote sources (e.g., media content source 416 (FIG. 4) and/or any location accessible via communications network 414 (FIG. 4)).

In such cases, the media assets may not be available to the user because the media asset is currently unavailable from the content source. For example, the media guidance application may not be currently able to access the media asset because the media asset is not currently being broadcast, a remote server used to process a request for the media asset is having technical difficulties, an Internet connection used to stream the media asset does not currently have enough bandwidth, a user device upon which the media guidance application is implemented is not configured to receive/play the current format of the media asset, etc. as explained above.

Alternatively or additionally, the media guidance application may not have the proper rights and/or authorization to access a particular media asset. For example, the media guidance application may need a subscription, password (e.g., to overcome a parental control setting), membership status, or other fee arrangement to access the media asset. While in some embodiments, the media guidance application may prompt the user regarding obtaining the proper authorization, in some embodiments, the media guidance application may exclude media assets to which the user does not have rights and/or authorization entirely.

If the media asset is not available, the media guidance application returns to step 604. If the media asset is available the media guidance application proceeds to step 610. At step 610, the media guidance application determines whether or not the run-time of the media asset corresponds to the window of availability of the user. For example, the media guidance application may cross-reference the media asset with a database associated with data about media asset and/or analyze data (e.g., metadata) associated with the media asset to determine the length of time the media asset requires to consume. For example, the media guidance application may input (e.g., using control circuitry 304 (FIG. 3)) a media asset into the database (e.g., storage 308 (FIG. 3) or a storage device accessible via communications network 414 (FIG. 4)). The database (e.g., structured as a look-up table) may retrieve a field associated with the run-time of the media asset, in which a value or values indicative of the time required to consume the media asset are contained. The media guidance application may then receive an output of the value or values in the field. The media guidance application may then determine (e.g., via processing circuitry 306 (FIG. 3)) if the value or values correspond (e.g., have a sufficient amount of similarity) to the window of availability of a user.

Alternatively or additionally, the media guidance application may analyze data associated with the media asset (e.g., metadata) to determine the run-time of the media asset. The media guidance application may then determine (e.g., via processing circuitry 306 (FIG. 3)) run-time corresponds (e.g., has a sufficient amount of similarity) to the window of availability of a user.

In some embodiments, the media guidance application may crop a media asset or present an abbreviated version (e.g., highlights) of the media asset in order to ensure that the run-time of the media asset corresponds to the window of availability of a user. In such cases, the media guidance application may prompt a user as to whether or not the user would like for the media guidance application to crop the media asset or resolve the conflict in another manner.

If the media guidance application determines that the run-time of the media asset does not correspond to the window of availability of the user, the media guidance application returns to step 604. If so, the media guidance application proceeds to step 612. At step 612, the media guidance application determines whether or not the media asset corresponds to the available user device. For example, while a media asset (e.g., a video game for a touch-screen enabled user device) may frequently be accessed after a particular activity, the user device currently available to a user may not have the capabilities (e.g., does not have a touch-screen) to support the selected media asset.

For example, the media guidance application may compare the media asset to a user device associated with a user to determine whether the user device will support a presentation of the media asset. For example, the media guidance application may input (e.g., using control circuitry 304 (FIG. 3)) the media asset into the database (e.g., storage 308 (FIG. 3) or a storage device accessible via communications network 414 (FIG. 4)), and the database (e.g., structured as a look-up table) may retrieve a field associated with the user device requirements. In another example, the media guidance application may receive the technical requirements associated with the media asset in data (e.g., metadata) transmitted with the media asset. The media guidance application may then compare the data outputted from the database or received with the media asset to the capabilities of the user device associated with the user to determine whether or not a user device associated with the user supports the media asset.

In some embodiments, as discussed above, the media guidance application may also determine if a user device within a threshold proximity of the user is capable of presenting the media asset. For example, the media guidance application may determine a distance between the user and a user device. The media guidance application may then determine whether the distance is within a threshold proximity to the user. In response to determining that the distance does not exceed the threshold proximity from the user, the media guidance application may compare the capabilities of the user device to determine whether or not a user device supports the media asset.

In some embodiments, if multiple user devices are located within a threshold proximity, the media guidance application may generate a recommendation that includes an indication of what user device the media asset is available on. For example, if a first user device does not support the media asset, a recommendation generated by the first user device may refer a user to a second user device, which does support the media asset, in order to access the media asset.

If the media guidance application determines that the media asset corresponds to the available user device, the media guidance application proceeds to step 614. If the media guidance application determines that the media asset does not correspond to the available user device, the media guidance application returns to step 604.

At step 614, the media guidance application stores the media asset in a list. For example, upon determining (e.g., via processing circuitry 306 (FIG. 3)) that an available media asset corresponds to the activity being performed by the user, the window of availability of a user, and the user device of a user, the media guidance application may store (e.g., in storage 308 (FIG. 3)) the selected media asset in a list for later retrieval. At step 616, the media guidance application determines whether or not there are any other activities currently being performed by a user. For example, the media guidance application may base recommendations off multiple activities being performed by a user. In such cases, the media guidance application may rank media assets according to the number of activities of the user that each media asset corresponds to. For example, a media asset corresponding to activities performed by the user may be ranked higher than a media asset corresponding to only a single activity performed by the user.

If the media guidance application determines that there are any other activities currently being performed by a user, the media guidance application returns to step 604; if not, the media guidance application proceeds to step 618 and recommends a media asset or assets from the stored list of stored media assets. For example, the media guidance application (e.g., via control circuitry 304 (FIG. 3)) may generate a recommendation of one or more of the selected media assets (e.g., media asset 214 (FIG. 2) for presentation in a display (e.g., display 100 (FIG. 1) or display 200 (FIG. 2)) on a display screen (e.g., on display 312 (FIG. 2)) of a user equipment device (e.g., user equipment devices 402, 404, and/or 406 (FIG. 4)). For example, the recommendation may feature a list of media assets that correspond to one or more recently performed activities, or the recommendation may feature only a single media asset. The recommendation may appear as a pop-up message, a display window (e.g., video region 122 (FIG. 1), a menu page, an overlay, and/or any other suitable method for conveying information to a user.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for recommending media content, the method comprising:
   receiving, using control circuitry, an activity datum, related to an activity being performed by a given user, wherein the activity is unrelated to media consumption;
   generating, using the control circuitry, a database of media asset identifiers associated with activities by:
      monitoring a plurality of users to identify a plurality of activities performed by the plurality of users, each of the plurality of activities being unrelated to media consumption;
      for each of the plurality of activities, identifying which media asset was accessed by a respective one of the plurality of users who performed a first of the plurality of activities, wherein the identified media asset was accessed by the respective one of the plurality of users after the respective one of the plurality of users finished performing the first activity; and
      for each of the plurality of activities, storing an identifier of the media asset identified as having been accessed by the respective one of the plurality of users;
   determining, using the control circuitry, based on the received activity datum, which of the plurality of activities in the database matches the activity performed by the given user;
   retrieving, using the control circuitry, from the database the identifier of the media asset associated with the determined activity;
   determining, using the control circuitry, whether the media asset corresponding to the retrieved identifier is available to the given user following the activity performed by the given user; and
   in response to determining the media asset corresponding to the retrieved identifier is available to the given user, generating, using the control circuitry, a recommendation of the media asset corresponding to the retrieved identifier to the given user for display on a display device.

2. The method of claim 1, wherein determining whether the media asset corresponding to the retrieved identifier is available to the given user following the activity further comprises:
   determining a time of completion for the activity performed by the given user; and
   determining whether the media asset corresponding to the retrieved identifier is available at the time of completion.

3. The method of claim 1, further comprising:
   determining a window of availability for the given user following the activity performed by the given user;
   determining whether the window of availability corresponds to a run-time of the media asset corresponding to the retrieved identifier; and
   in response to determining the window of availability does not correspond to the run-time of the media asset corresponding to the retrieved identifier, selecting a different media asset.

4. The method of claim 1, further comprising:
   determining a type of user equipment available to the given user following the activity performed by the given user;
   determining whether the type of user equipment available to the given user corresponds to presenting the media asset corresponding to the retrieved identifier; and
   in response to determining the type of user equipment available to the user does not correspond to presenting the media asset corresponding to the retrieved identifier, selecting a different media asset.

5. The method of claim 1, further comprising identifying a user device, within a threshold proximity to the given user following the activity, for generating a presentation of the recommendation.

6. The method of claim 1, wherein the database indicates subject matters for each of the media assets, and wherein retrieving the identifier further comprises determining whether a subject matter of the media asset corresponds to the activity performed by the given user.

7. The method of claim 1, wherein the user shares a demographic group, a social network group, or a familial group with the users.

8. The method of claim 1, wherein the activity is a physical activity which requires bodily movement produced by skeletal muscles.

9. The method of claim 1, wherein the activity datum is received from a home appliance associated with cooking or cleaning, a door associated with an open state or a closed state, a security system associated with monitoring movement within a household, media equipment associated with presenting media, an electronic device associated with an active mode or an inactive mode, or a vehicle associated with transporting the user.

10. The method of claim 1, wherein the activity datum identifies the given user performing the activity.

11. A system for recommending media content, the system comprising control circuitry that:
   receives an activity datum, related to an activity being performed by a given user wherein the activity is unrelated to media consumption;
   generates a database of media asset identifiers associated with activities by:
      monitoring a plurality of users to identify a plurality of activities performed by the plurality of users, each of the plurality of activities being unrelated to media consumption;
      for each of the plurality of activities, identifying which media asset was accessed by a respective one of the plurality of users who performed a first of the plurality of activities, wherein the identified media asset was accessed by the respective one of the plurality of users after the respective one of the plurality of users finished performing the first activity; and
      for each of the plurality of activities, storing an identifier of the media asset identified as having been accessed by the respective one of the plurality of users;
   determines, based on the received activity datum, which of the plurality of activities in the database matches the activity performed by the given user;
   retrieve from the database the identifier of the media asset associated with the determined activity;
   determines whether the media asset corresponding to the retrieved identifier is available to the given user following the activity performed by the given user; and
   in response to determining the media asset corresponding to the retrieved identifier is available to the given user, generates a recommendation of the media asset corresponding to the retrieved identifier to the given user.

12. The system of claim 11, wherein the control circuitry that determines whether the media asset corresponding to the retrieved identifier is available to the given user following the activity:
   determines a time of completion for the activity performed by the given user; and
   determines whether the media asset corresponding to the retrieved identifier is available at the time of completion.

13. The system of claim 11, wherein the control circuitry:
   determines a window of availability for the given user following the activity performed by the given user;
   determines whether the window of availability corresponds to a run-time of the media asset corresponding to the retrieved identifier; and
   in response to determining the window of availability does not correspond to the run-time of the media asset corresponding to the retrieved identifier, selects a different media asset.

14. The system of claim 11, wherein the control circuitry:
   determines a type of user equipment available to the given user following the activity performed by the given user;
   determines whether the type of user equipment available to the given user corresponds to presenting the media asset corresponding to the retrieved identifier; and
   in response to determining the type of user equipment available to the user does not correspond to presenting the media asset corresponding to the retrieved identifier, selects a different media asset.

15. The system of claim 11, wherein the control circuitry identifies a user device, within a threshold proximity to the given user following the activity, for generating a presentation of the recommendation.

16. The system of claim 11, wherein the database indicates subject matters for each of the media assets, and wherein the media asset identifier is retrieved based on determining the corresponding media asset has a subject matter that corresponds to the activity performed by the given user.

17. The system of claim 11, wherein the user shares a demographic group, a social network group, or a familial group with the users.

18. The system of claim 11, wherein the activity is a physical activity which requires bodily movement produced by skeletal muscles.

19. The system of claim 11, wherein the activity datum is received from a home appliance associated with cooking or cleaning, a door associated with an open state or a closed state, a security system associated with monitoring movement within a household, media equipment associated with presenting media, an electronic device associated with an active mode or an inactive mode, or a vehicle associated with transporting the user.

20. The system of claim 11, wherein the activity datum identifies the given user performing the activity.

* * * * *